US008978791B2

(12) United States Patent
Ha et al.

(10) Patent No.: US 8,978,791 B2
(45) Date of Patent: Mar. 17, 2015

(54) VEHICLE FORMING A SELF-BALANCING HUMAN TRANSPORTER WITH AN INTEGRATED PHOTOVOLTAIC MODULE

(75) Inventors: Duy Long Ha, Chambery (FR); Olivier Wiss, Lyons (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 0 days.

(21) Appl. No.: 13/503,689

(22) PCT Filed: Oct. 28, 2010

(86) PCT No.: PCT/EP2010/066321
§ 371 (c)(1),
(2), (4) Date: Apr. 24, 2012

(87) PCT Pub. No.: WO2011/051372
PCT Pub. Date: May 5, 2011

(65) Prior Publication Data
US 2012/0205176 A1    Aug. 16, 2012

(30) Foreign Application Priority Data

Oct. 30, 2009    (FR) ..................... 09 57695

(51) Int. Cl.
*B62D 57/00*    (2006.01)
*B62K 17/00*    (2006.01)
(Continued)

(52) U.S. Cl.
CPC *B62K 17/00* (2013.01); *B62H 1/00* (2013.01); *B62K 3/007* (2013.01)
USPC .......................................... 180/7.1; 180/218

(58) Field of Classification Search
CPC ........ B62D 57/00; B62K 3/007; A63G 25/00; B60K 16/00
USPC ............................................. 180/2.1, 2.2, 218
See application file for complete search history.

(56) References Cited

U.S. PATENT DOCUMENTS 4,494,764 A * 1/1985 Kelley ........................... 280/293
4,817,977 A * 4/1989 Bookbinder .................. 280/304
(Continued)

FOREIGN PATENT DOCUMENTS

DE  20 2007 004 010 U1   7/2008
WO  WO 00/75001 A1   12/2000

OTHER PUBLICATIONS

"Segway HT reference manual", retrieved Feb. 7, 2013 from http://web.archive.org/web/20071025103610/http://www.segway.com/downloads/pdfs/Reference_Manual.pdf, Copyright 2005 and publically available at least as early as Oct. 25, 2007, as shown by the Internet Archive Wayback Machine.*

(Continued)

*Primary Examiner* — Joseph Rocca
*Assistant Examiner* — Conan Duda
(74) *Attorney, Agent, or Firm* — Oblon, McClelland, Maier & Neustadt, L.L.P.

(57) ABSTRACT

A vehicle forming a self-balancing human transporter, or "gyropode", including a photovoltaic module to charge a battery electrically or to partially power an electric motor electrically from solar energy. The photovoltaic module includes a first portion which is fixed and extends along a standing and driving handle, and a second portion which is retractable between an extreme retracted position in which it allows the gyropode to be moved, and an extreme deployed position in which it acts as a stand for holding the gyropode when stopped with a determined inclination enabling optimum efficiency of the photovoltaic module to be obtained relative to a position of the sun.

9 Claims, 2 Drawing Sheets

Figure 1A:
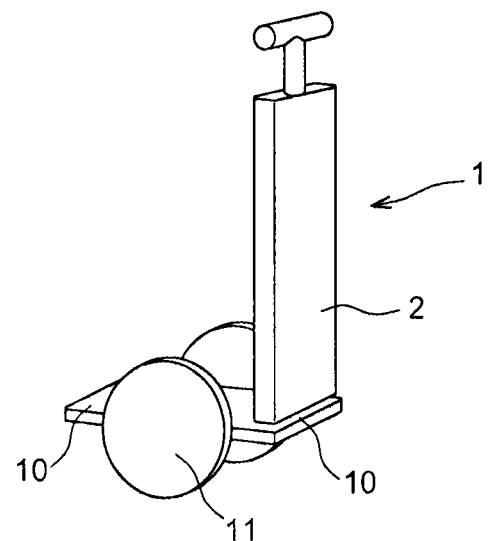

(51) Int. Cl.
  *B62H 1/00* (2006.01)
  *B62K 3/00* (2006.01)

(56) References Cited

U.S. PATENT DOCUMENTS

| | | | | |
|---|---|---|---|---|
| 4,846,491 | A * | 7/1989 | Caceres | 280/301 |
| 5,465,989 | A * | 11/1995 | Grove | 280/250 |
| 5,701,965 | A * | 12/1997 | Kamen et al. | 180/7.1 |
| 5,971,091 | A * | 10/1999 | Kamen et al. | 180/218 |
| 6,371,501 | B2 * | 4/2002 | Jenkins | 280/216 |
| 6,494,423 | B1 * | 12/2002 | Ruth | 248/188.8 |
| 6,561,294 | B1 * | 5/2003 | Kamen et al. | 180/21 |
| 7,395,625 | B2 * | 7/2008 | Chladny | 40/591 |
| 8,157,043 | B2 * | 4/2012 | Gulak | 180/218 |
| 2003/0094315 | A1 * | 5/2003 | White | 180/2.2 |
| 2004/0216929 | A1 * | 11/2004 | White | 180/2.2 |
| 2005/0072843 | A1 * | 4/2005 | Chladny | 235/384 |
| 2005/0156403 | A1 * | 7/2005 | Labonte et al. | 280/304 |
| 2006/0062515 | A1 * | 3/2006 | Mahbobi | 385/24 |
| 2006/0157625 | A1 * | 7/2006 | Griggs | 248/188.8 |
| 2008/0012750 | A1 * | 1/2008 | Austin et al. | 342/52 |
| 2008/0271938 | A1 * | 11/2008 | Gulak | 180/220 |
| 2009/0107486 | A1 * | 4/2009 | Tsai et al. | 126/604 |

OTHER PUBLICATIONS

"yourgreendream", retrieved Jul. 2, 2014 from http://www.yourgreendream.com/diy_panel_position.php.*

French Preliminary Search Report issued Jan. 11, 2010 in Patent Application No. FR 0957695 with Translation of Category of Cited Documents.

* cited by examiner

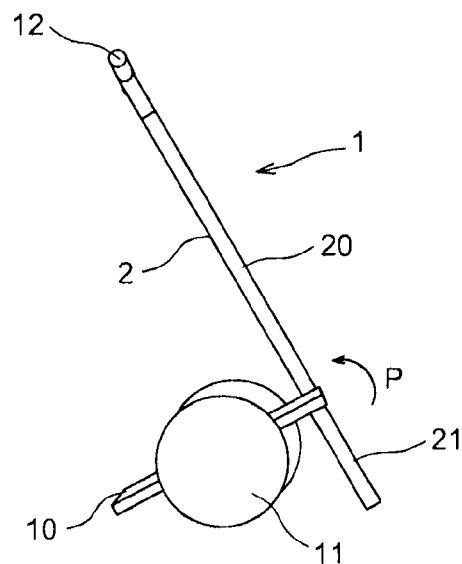
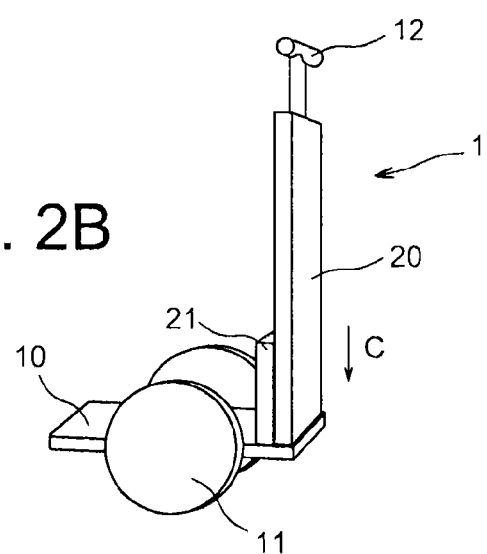
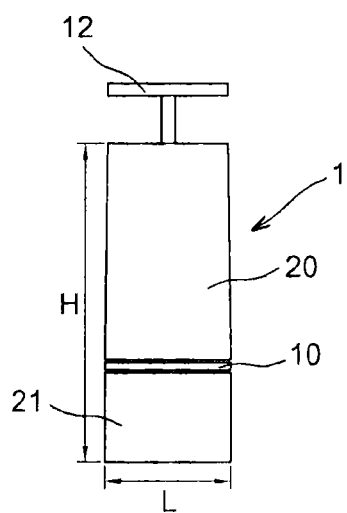

VEHICLE FORMING A SELF-BALANCING HUMAN TRANSPORTER WITH AN INTEGRATED PHOTOVOLTAIC MODULE

TECHNICAL FIELD

The invention concerns a vehicle of the self-balancing human transporter, or "gyropode", type, i.e. according to the commonly used definition, a one-person vehicle with an electric motor, including a platform fitted with two wheels on which the user stands upright, with a gyroscopic stabilisation system and with a standing and steering handle.

The invention relates more specifically to the integration in the gyropode of a photovoltaic module enabling its battery to be recharged optimally either when it is moving or when it is stopped.

PRIOR ART

Electric vehicles of the gyropode type are person carriers equipped with electric motors and a gyroscopic technology which enables the person to stand in balanced fashion on both parallel wheels without the user having to compensate for the instability caused by the centre of gravity being out of plumb. Thus, the user is standing and does not need to place their foot on the ground either to balance or to advance.

In other words, a gyropode constitutes the first two-wheeled means of transport which has dynamic stabilisation, provided through a system of control of the wheels using inclination sensors (called gyroscopes). This type of vehicle enables a person, whilst occupying the same area as a pedestrian, to move more rapidly, and silently, and without emitting any pollution in a pedestrian space.

Commercially, gyropodes are in a market where scooters and bicycles are already present (in their electric versions), but they add to these some functions which are unique for a two-wheeled means of transport:

Forwards movement and backwards movement,
Rotation on the spot (zero turning radius),
Maintains balance when standing still.

The company Segway is the world leader of electric personal transport, and has already sold a large number of gyropodes under the commercial name "Segway TP" or "Segway HT".

All electric vehicles of the gyropode type which are already in existence, such as Segway TP or HT, include a battery which is charged through a cable and socket unit from the electrical distribution network.

Although gyropodes have low electrical consumption compared to electric cars, existing gyropodes' battery-charging solution is not entirely satisfactory from an economic and ecological standpoint. In addition, gyropodes are very dependent on the location of the electrical distribution network. And, given the sought use, gyropodes are designed to go into non-urban locations (golf courses, countryside, mountain locations, etc.) which, by definition, have no distribution network electrical sockets.

Electric vehicles other than gyropodes, such as cars, with integrated photovoltaic panels which allow the battery to be charged or other accessories present on the vehicle to operate, are already known. There are generally at least two such photovoltaic panels, and they are integrated in, or constitute at least a portion of, the bodywork of the vehicle. Thus, for economic and ecological purposes, implementing a gyropode battery-charging solution by integrating a photovoltaic module in it seems conceivable.

This being so, unlike electric vehicles other than gyropodes, and as previously mentioned, a gyropode has functions specific to it:

gyroscopic stability,
the possibility of producing both forwards movement and backwards movement,
the possibility of rotating on the spot (zero turning radius).

In addition, it would be of interest to be able to integrate a photovoltaic module in existing gyropodes without too many structural modifications.

The aim of the invention is thus to propose a new gyropode battery-charging solution by integrating a photovoltaic module, which is adaptable to gyropodes which are already in existence, and which does not impair the functions inherent to gyropodes.

ACCOUNT OF THE INVENTION

To accomplish this, the object of the invention is a vehicle forming a gyropode including a handle for standing still, and for driving by a user, at least one electric motor to rotate the wheels of the gyropode, a battery enabling the electric motor(s) to be powered, characterised in that it includes a photovoltaic module to charge the battery electrically, or to partially power the electric motor from solar energy, where the photovoltaic module includes two portions, one of which is fixed and extends along the standing and driving handle, and the other of which can be retracted between an extreme retracted position in which it enables the gyropode to be moved, and an extreme deployed position, in which it acts as a stand for holding the gyropode when stopped, with at least one determined inclination, enabling the efficiency of the entire photovoltaic module to be increased relative to the position of the sun.

Thus, according to the invention, a photovoltaic module is integrated in a gyropode which enables the photovoltaic area to be maximised without sacrificing the gyropode's normal functions. It is thus possible to turn to advantage the gyropode's on-the-spot rotation function to implement optimal tracking of the sun. It is also perfectly possible to integrate the photovoltaic module in a gyropode which is already in existence.

We stipulate here that in the context of the invention, a photovoltaic module must be understood as being an electrical generator of direct current including at least one assembly of photovoltaic cells connected to one another electrically. In the context of the invention, only the retractable portion of the photovoltaic module needs to be rigid, in order to constitute a stand to hold the gyropode stopped in its inclined position.

According to a first embodiment, the retractable portion is retractable by sliding from the extreme retracted position in which it extends roughly parallel to the fixed portion of the photovoltaic module.

Advantageously, the sliding portion of the photovoltaic module can also be pivoting in its extreme deployed position, in order to modify the inclination of the gyropode.

According to a second embodiment, the retractable portion is retractable by pivoting from the extreme retracted position in which it extends roughly parallel and underneath the platform of the gyropode.

The gyropode preferably includes electric motor means to retract the retractable portion of the photovoltaic module from its extreme retracted position as far as its extreme deployed position. These electric motor means advantageously consist of a servomotor.

For the currently existing dimensions and electrical consumption of gyropodes, the total area of the photovoltaic module may be between 0.5 m² and 1.5 m².

The invention which has just been described enables the active area of the integrated photovoltaic module to be maximised, but without degrading the gyropode's original functions.

BRIEF DESCRIPTION OF THE ILLUSTRATIONS

Figure 1B:
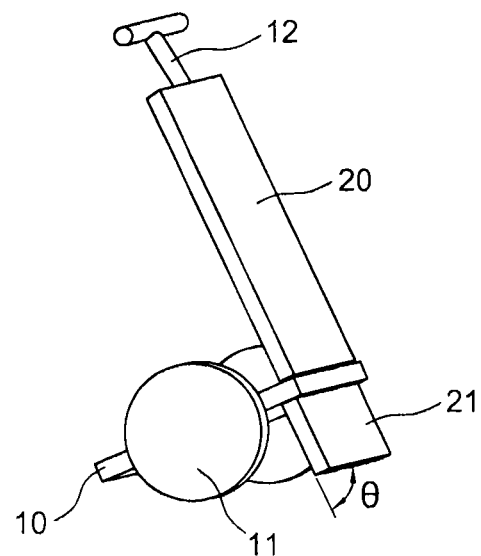

Other advantages and characteristics will be seen more clearly on reading the detailed description of the invention, made with reference to the following figures, among which:

FIGS. 1A and 1B are schematic perspective views of a gyroscope according to the invention, respectively in a moving and in a stopped configuration, FIGS. 2A and 2B are schematic side views of a gyroscope, respectively according to a first and second embodiment of the invention, FIG. 3 is a schematic front view of a gyroscope according to the invention in a stopped configuration.

DETAILED ACCOUNT OF PARTICULAR EMBODIMENTS

As it currently exists, gyropode 1 is a one-person vehicle with an electric motor, including a platform 10 fitted with two wheels 11, on which the user stands upright, a gyroscopic stabilisation system (not represented) and a standing and driving handle 12. Such a gyropode is widely sold under the commercial name Segway™.

The gyroscope according to invention 1 also includes an integrated photovoltaic module 2 to charge the battery electrically, or to power the electric motor electrically.

When it is in the moving configuration (FIG. 1A), only a portion 20 of photovoltaic module 2 enables the battery to be charged according to the sunshine conditions. This portion 20 is therefore fixed, and extends along standing and driving handle 12. In this movement configuration, another portion 21, having a smaller area than fixed portion 20, is retracted. All the normal functions of the gyropode are maintained, and the gyroscopic stability must be designed such that it compensates for the weight of module 2 at the front of the gyropode. In other words, there is permanent regulation to balance gyropode 1 with its photovoltaic module 2.

When it is in the stop configuration, the other portion 21 is deployed from inside towards the outside, until it reaches an extreme deployed position (FIG. 1B), in which it acts as a stand for holding the gyropode in place when stopped, with at least one determined inclination enabling the best yield of the entire photovoltaic module to be obtained relative to the position of the sun. As represented in FIG. 1B, gyropode 1 is inclined by a value θ of the order of 60° relative to horizontal, due to second portion 21 of module 2.

For the deployment of second portion 21, a motorised actuator, such as a servomotor, can be included. Alternatively, and more simply, the users themselves can manually push the base of second portion in order to reach the extreme position, and thus incline the gyropode, and vice versa to configure it in moving mode.

Two modes of deployment of second portion 21 can be envisaged:

in a pivoting movement as symbolised by arrow P in FIG. 2A, where second portion 21 of module 20 extends beneath platform 10 of gyropode 1 in its retracted position, in a sliding movement as symbolised by arrow C in FIG. 2B, where second portion 21 of module extends along first portion 21 in its retracted position (FIG. 2B).

The energy balance of a photovoltaic module 2 to be integrated according to the invention on a gyropode which is already sold under the commercial name Segway™ i2 is now described, using the manufacturer's data, as follows.

Speed of Movement:
Pavement Mode (Called Tortoise Mode):
Maximum speed: 9.6 km/h—Very slow bends
Open Spaces Mode:
Maximum speed: 20 km/h—Very fast bends
Existing Autonomy and Recharging Time:
The Segway™ i2 is fitted with two brushless electric motors (1.5 kw each). Its autonomy is between 25 and 38 km for a full charge with Lithium-Ion batteries (400 Wh capacity), or between 13 and 19 km for a full charge with NiMH batteries (220 Wh capacity). Therefore, a consumption of 10.5 Wh to 16 Wh par km traveled is estimated.
Recharging Time:
approximately 5 h for a NiMH battery
approximately 8 h for a Li-Ion battery
Dimensions:
Height of platform 10: 21 cm
Floor encumbrance: 64×64 cm
Transport Capacity:
The Segway™ i2 is designed to be able to transport a driver weighing a maximum of 118 kg. For safety reasons the driver must weigh at least 50 kg. If the driver is too light, indeed, the Driver Mass/Gyropode Mass ratio is too low for the machine to be controlled in perfect safety.
Calculation of the Required Area of Photovoltaic Module 2 According to the Invention:
On the basis of sunshine hypotheses corresponding to an average case throughout the world, such as can be found, for example, in a city such as Lyon in France.

The average solar resource per year is estimated to be approximately 3.92 kWh/m²/day. With hypotheses that the efficiency of a photovoltaic module 2 is of the order of 12%, an available solar energy of 470 Whm²/day likely to be produced at the output of photovoltaic module 2 is obtained.

Thus, to accomplish efficient electrical charging of the Segway™ i2 by the photovoltaic module during a day with an average degree of sunshine, an area $S_{avg}$ of the photovoltaic module is required:

$$S_{avg} = \text{battery capacity/solar energy available per day},$$

i.e. for a NiMH battery:

$$S_{avg} = 220/470 \approx 0.5 \text{ m}^2.$$

And for a Li-Ion battery:

$$S_{avg} = 400/470 \approx 0.85 \text{ m}^2.$$

The inventors thus reach the conclusion that a photovoltaic module 2 of an efficiency of 12% which must be integrated according to the invention in a Segway™ i2 must satisfy the following two constraints:

1. a necessary area $S_{avg}$ of at least 0.5 m² for a NiMH battery and 0.85 m² for a Li-Ion battery, 2. a weight not exceeding 38 kg (bearing in mind that the average weight of a user is of the order of 80 kg).

With the known dimensions of driving and standing handle 10 of a Segway™ i2 and a maximum inclination θ of the order of 60°, the total area $S_T$ of module 2 which can be installed on Segway™ i2 is equal to:

$$S_T = \text{Width } L * \text{Height } H, \text{ i.e. } S_T = 1.50 * O, 64 = 0.95 \text{ m}^2.$$

Dimensions L and H are represented in the front view of the gyropode in FIG. 3.

The inventors thus reach the conclusion that the total area $S_T$ which can be physically installed on the Segway™ i2 is sufficient to satisfy the dimensioning schedule of specifications, since total area $S_T$ is greater than the maximum of $S_{avg} \cong 0.85$ m².

In terms of weight, a photovoltaic module 2 of a total area $S_T$ of the order of 1.5 m² weighs approximately 20 kg.

Thus, bearing in mind commercial available photovoltaic module 2, the weight of a photovoltaic module 2 to be integrated, which has an area of 0.95 m², weighs approximately 12 kg in respect of the module and 0.5 kg in respect of the added charge regulator and wiring.

The total weight of the photovoltaic module and the on-board electronics on the gyropode is thus 12.5 kg. The inventors reach the conclusion that such a weight perfectly satisfies the schedule of specifications, since it is less than 38 kg.

Naturally, it is always possible to envisage integrating photovoltaic modules of lesser weight within the scope of the invention.

The invention claimed is:

1. A vehicle forming a self-balancing human transporter, or gyropode, comprising:
    a handle to stand still, and to drive by a user, at least one electric motor to rotate wheels of the gyropode;
    a battery to power the at least one electric motor;
    a photovoltaic module to charge the battery electrically, or to partially power the electric motor from solar energy,
    wherein the photovoltaic module includes a first portion that is fixed and extends along the handle and that performs at least part of the charging of the battery based on the solar energy, and
    the photovoltaic module includes a second portion that performs at least another part of the charging of the battery based on the solar energy and that is retractable between an extreme retracted position in which the second portion enables the gyropode to be moved, and an extreme deployed position to increase a yield of the photovoltaic module by orienting the gyropode at a determined inclination angle relative to vertical such that the gyropode leans backwards away from vertical.

2. The vehicle forming a gyropode according to claim 1, wherein the second portion is retractable by sliding from the extreme retracted position in which it extends substantially parallel to the fixed portion of the photovoltaic module.

3. The vehicle forming a gyropode according to claim 2, wherein the second portion of the photovoltaic module is further configured to pivot in the extreme deployed position, to modify inclination of the gyropode.

4. The vehicle forming a gyropode according to claim 1, wherein the second portion is retractable by pivoting from the extreme retracted position in which the second portion extends substantially parallel to and under a platform of the gyropode.

5. The vehicle forming a gyropode according to claim 1, further comprising an electric motor to extend the second portion of the photovoltaic module from the extreme retracted position to the extreme deployed position.

6. The vehicle forming a gyropode according to claim 5, wherein the electric motor comprises a servomotor.

7. The vehicle forming a gyropode according to claim 1, wherein a total area of the photovoltaic module, including both first and second portions, is between 0.5 and 1.5 m².

8. The vehicle forming a gyropode according to claim 7, wherein the second portion has a smaller area than the first portion.

9. The vehicle forming a gyropode according to claim 1, wherein the determined inclination angle is sixty degrees relative to a horizontal plane.

* * * * *